US010767777B2

(12) United States Patent
Liu et al.

(10) Patent No.: US 10,767,777 B2
(45) Date of Patent: Sep. 8, 2020

(54) EJECTOR OF A WATER SOFTENER VALVE AND WATER SOFTENER VALVE

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Guohua Liu, Foshan (CN); Zhifeng He, Foshan (CN)

(*) Notice: Subject to any disclaimer, the term of this patent is extended or adjusted under 35 U.S.C. 154(b) by 101 days.

(21) Appl. No.: 16/179,935

(22) Filed: Nov. 3, 2018

(65) Prior Publication Data

US 2019/0072199 A1 Mar. 7, 2019

(30) Foreign Application Priority Data

Apr. 28, 2018 (CN) .......................... 2018 1 0413971
Apr. 28, 2018 (CN) .......................... 2018 1 0413973
(Continued)

(51) Int. Cl.
*C02F 1/42* (2006.01)
*F16K 27/04* (2006.01)
(Continued)

(52) U.S. Cl.
CPC ............ *F16K 27/041* (2013.01); *B01F 5/043* (2013.01); *B01J 49/85* (2017.01); *C02F 1/42* (2013.01);
(Continued)

(58) Field of Classification Search
CPC .. F16K 27/041; F16K 11/0787; F16K 27/003; C02F 1/42; C02F 1/5245;
(Continued)

(56) References Cited

U.S. PATENT DOCUMENTS 2,775,984 A * 1/1957 Dahl ........................ F16L 55/04
138/45
3,139,041 A * 6/1964 Techler .................... B01J 49/75
417/189
(Continued)

FOREIGN PATENT DOCUMENTS

CN 2069411 U 1/1991
CN 201007372 Y 1/2008
(Continued)

OTHER PUBLICATIONS

International Search Report dated Jan. 18, 2019 corresponding to International Application No. PCT/CN2018/111151.

*Primary Examiner* — Matthew O Savage
(74) *Attorney, Agent, or Firm* — Kilpatrick Townsend & Stockton, LLP

(57) ABSTRACT

Disclosed is an ejector of a water softener valve, a water softener valve and a water softener. The ejector includes: an ejecting part, the ejecting part internally defines an ejecting hole, the ejecting hole is gradually tapered along an ejecting direction; a confluence part, the confluence part internally defines a confluence hole, an inlet of the confluence hole faces an outlet of the ejecting hole, an aperture of the inlet of the confluence hole is greater than an aperture of the outlet of the ejecting hole, a surface of the confluence part and a surface of the ejecting part facing the surface of the confluence part cooperatively form a saline solution suction opening; and a connecting part, fixedly connected with the ejecting part and the confluence part, the connecting part, the ejecting part, and the confluence part are integrated together.

9 Claims, 14 Drawing Sheets

(30) Foreign Application Priority Data

Apr. 28, 2018 (CN) .......................... 2018 1 0413975
Apr. 28, 2018 (CN) ..................... 2018 2 0649055 U
Apr. 28, 2018 (CN) ..................... 2018 2 0649057 U
Apr. 28, 2018 (CN) ..................... 2018 2 0649173 U

(51) Int. Cl.
*B01F 5/02* (2006.01)
*F16K 27/00* (2006.01)
*F16K 11/078* (2006.01)
*B01J 49/85* (2017.01)
*B01F 5/04* (2006.01)

(52) U.S. Cl.
CPC ........ *F16K 11/0787* (2013.01); *F16K 27/003* (2013.01); *C02F 2001/425* (2013.01); *C02F 2201/005* (2013.01); *C02F 2209/40* (2013.01); *C02F 2303/16* (2013.01)

(58) Field of Classification Search
CPC .................. C02F 5/00; C02F 2201/005; C02F 2001/425; C02F 2303/16; C02F 2209/40; F04F 5/043; F04F 5/46; B01F 5/043
USPC ......... 210/191, 278; 417/151, 198; 137/517, 137/565.22, 888
See application file for complete search history.

(56) References Cited

U.S. PATENT DOCUMENTS 3,146,726 A * 9/1964 Sidebottom ............ F16K 24/06 417/198
3,467,022 A * 9/1969 Techler ..................... C02F 1/42 417/179
7,784,999 B1 * 8/2010 Lott ...................... B01F 5/0413 137/888

FOREIGN PATENT DOCUMENTS

| | | |
|---|---|---|
| CN | 107986406 A | 5/2018 |
| JP | 2005261991 A | 9/2005 |

* cited by examiner

EJECTOR OF A WATER SOFTENER VALVE AND WATER SOFTENER VALVE

CROSS-REFERENCE TO RELATED APPLICATIONS

This application claims a priority to and benefits of Chinese Patent Application Serial No. 201810413975.5, 201820649173.X, 201810413973.6, 201820649057.8, 201810413971.7 and 201820649055.9, filed with the State Intellectual Property Office of P. R. China on Apr. 28, 2018, the entire contents of which are incorporated herein by reference.

FIELD

The present disclosure generally relates to the technical field of water processing equipment, and more particularly relates to an ejector, a water softener valve, and a water softener.

BACKGROUND

A water softener can soften the water, thereby improving the user's water quality experience, saving detergent, saving water and so on. A core component of the water softener is water softener valve.

One application of the water softener valve is that controlling the saline solution suction and regenerating process of the water softener. During the saline solution suction and regenerating process, an ejector is utilized to generate a negative pressure at a saline solution suction port, such that the saline solution can be brought into a confluence passage, to regenerate an ion exchange filter material, for example, a softened resin.

The current ejector includes an ejecting main component, and an ejecting secondary component separately to the ejecting main component, the relative location of the ejecting main component and the ejecting secondary component need to be precisely controlled, for example, the center of an ejecting hole should align to the center of a confluence hole, and the size of the saline solution suction opening formed between the ejecting main component and the ejecting secondary component also should be precisely controlled, any of which there is a slight deviation may cause the water softener ineffective. In addition, the ejecting main component and the ejecting secondary component need to be manufactured separately, and then tightly matched to the inner surface of an ejecting passage. This would cause a high production cost and a high mounting cost.

SUMMARY

The present disclosure provides an ejector of a water softener valve, which can solve the deficiencies of the current ejectors, such as difficult to mount or manufacture, and high assembly cost.

In one embodiment, the ejector provided by present disclosure includes:

an ejecting part, the ejecting part internally defines an ejecting hole, the ejecting hole is gradually tapered along an ejecting direction;

a confluence part, the confluence part internally defines a confluence hole, an inlet of the confluence hole faces an outlet of the ejecting hole, an aperture of the inlet of the confluence hole is greater than an aperture of the outlet of the ejecting hole, a surface of the confluence part and a surface of the ejecting part facing the surface of the confluence part cooperatively form a saline solution suction opening; and a connecting part, fixedly connected with the ejecting part and the confluence part, the connecting part, the ejecting part, and the confluence part are integrated together.

Selectively, an inner surface of the confluence hole is defined with a plurality of guiding ribs protruding from the inner surface of the confluence hole and extending along the ejecting direction, each two adjacent guiding ribs cooperatively form a guiding groove, to form a plurality of guiding grooves parallel to each other in the inner surface of the confluence hole.

Selectively, the confluence hole includes an enlarged section and a plain section, the enlarged section is gradually enlarged along the ejecting direction, the enlarged section is adjacent to the ejecting part, the plain section is connected with the far end of the enlarged section along the ejecting direction.

Selectively, the guiding ribs are defined on the plain section.

Selectively, each guiding rib includes a convex cambered surface connecting with the inner surface of the plain section, a width of a connecting line of the convex cambered surface and the inner surface of the plain section along the circumferential direction gradually increases along the ejecting direction.

Selectively, the guiding ribs are uniformly arranged at the inner surface of the confluence hole along the circumferential direction.

Selectively, each guiding rib includes a convex cambered surface connecting with the inner surface of the plain section, a width of a connecting line of the convex cambered surface and the inner surface of the plain section along the circumferential direction gradually increases along the ejecting direction.

Selectively, the sectional area of each guiding rib at the outlet of the confluence hole equates with the sectional area of the corresponding guiding groove Selectively, the guiding ribs are gradually enlarged along the ejecting direction.

Selectively, the projecting heights of the guiding ribs are gradually enlarged along the ejecting direction; and/or, the projecting widths of the guiding ribs are gradually enlarged along the ejecting direction.

Selectively, the range of the projecting height or the range of the projecting width of the guiding ribs is less than 3 mm.

Selectively, the outer surface of each guiding ribs can have a round arc structure.

Selectively, the ejecting section includes a first barrel and a first matching part, the ejecting hole is formed in the first barrel, the first matching part is defined at the end of the first barrel away from the confluence part, the first matching part is configured to tightly connect to an ejecting passage of the water softener valve; and the confluence part includes a second barrel and a second matching part, the confluence hole is formed in the second barrel, the second matching part is defined at the end of the second barrel away from the confluence part, the second matching part is configured to tightly connect to the ejecting passage of the water softener valve.

Selectively, the first matching part is protruded on the outer peripheral surface of the first barrel, the second matching part is protruded on the outer peripheral surface of the second barrel;

the first matching part, the outer peripheral surface of the first barrel, the outer peripheral surface of the second barrel, and the second matching part cooperatively form a buffering dent communicating with the saline solution suction opening.

Selectively, the end of the first matching part away from the confluence part defines an annular step groove, the step groove is configured to mount a sealing ring; the end of the second matching part away from the ejecting part defines a chamfering, a chamfered surface of the chamfering resists the other sealing ring.

Selectively, the first barrel and the second barrel are concentric, and the outer diameter of the first barrel equates with the outer diameter of the second barrel.

Selectively, there are a plurality of connecting parts;

one end of the connecting part is connected with the end surface of the first barrel facing the second barrel, and adjacent to the outer periphery of the first barrel;

the other end of the connecting end is connected with the end surface of the second barrel, and adjacent to the second barrel.

The present disclosure also provides a water softener valve, which includes a valve body, the valve body includes a valve cavity, an ejecting passage, and a saline solution suction passage, the water softener valve further includes an ejector, the ejector includes:

an ejecting part, the ejecting part internally defines an ejecting hole, the ejecting hole is gradually tapered along an ejecting direction;

a confluence part, the confluence part internally defines a confluence hole, an inlet of the confluence hole faces an outlet of the ejecting hole, an aperture of the inlet of the confluence hole is greater than an aperture of the outlet of the ejecting hole, a surface of the confluence part and a surface of the ejecting part facing the surface of the confluence part cooperatively form a saline solution suction opening; and a connecting part, fixedly connected with the ejecting part and the confluence part, the connecting part, the ejecting part, and the confluence part are integrated together;

the ejector is received in the ejecting passage, the saline solution suction passage communicates with the saline solution suction opening of the saline solution suction passage.

Selectively, an inner surface of the confluence hole is defined with a plurality of guiding ribs protruding from the inner surface of the confluence hole and extending along the ejecting direction, each two adjacent guiding ribs cooperatively form a guiding groove, to form a plurality of guiding grooves parallel to each other in the inner surface of the confluence hole.

Selectively, the confluence hole includes an enlarged section and a plain section, the enlarged section is gradually enlarged along the ejecting direction, the enlarged section is adjacent to the ejecting part, the plain section is connected with the far end of the enlarged section along the ejecting direction.

Selectively, the guiding ribs are defined on the plain section.

Selectively, each guiding rib includes a convex cambered surface, a width of a connecting line of the convex cambered surface and the inner surface of the plain section along the circumferential direction gradually increases along the ejecting direction.

Selectively, the guiding ribs are uniformly arranged at the inner surface of the confluence hole along the circumferential direction.

Selectively, each guiding rib includes a convex cambered surface, a width of a connecting line of the convex cambered surface and the inner surface of the plain section along the circumferential direction gradually increases along the ejecting direction.

Selectively, the sectional area of each guiding rib at the outlet of the confluence hole equates with the sectional area of the corresponding guiding groove Selectively, the guiding ribs are gradually enlarged along the ejecting direction.

Selectively, the projecting heights of the guiding ribs are gradually enlarged along the ejecting direction; and/or, the projecting widths of the guiding ribs are gradually enlarged along the ejecting direction.

Selectively, the range of the projecting height or the range of the projecting width of the guiding ribs is less than 3 mm.

Selectively, the outer surface of each guiding ribs can have a round arc structure.

Selectively, the ejecting part includes a first barrel and a first matching part, the ejecting hole is formed in the first barrel, the first matching part is defined at the end of the first barrel away from the confluence part, the first matching part is configured to tightly connect to an ejecting passage of the water softener valve; and the confluence part includes a second barrel and a second matching part, the confluence hole is formed in the second barrel, the second matching part is defined at the end of the second barrel away from the confluence part, the second matching part is configured to tightly connect to the ejecting passage of the water softener valve.

Selectively, the first matching part is protruded on the outer peripheral surface of the first barrel, the second matching part is protruded on the outer peripheral surface of the second barrel;

the first matching part, the outer peripheral surface of the first barrel, the outer peripheral surface of the second barrel, and the second matching part cooperatively form a buffering dent communicating with the saline solution suction opening.

Selectively, the end of the first matching part away from the confluence part defines an annular step groove, the step groove is configured to mount a sealing ring; the end of the second matching part away from the ejecting part defines a chamfering, a chamfered surface of the chamfering resists the other sealing ring.

Selectively, the first barrel and the second barrel are concentric, and the outer diameter of the first barrel equates with the outer diameter of the second barrel.

Selectively, there are multiple connecting parts;

one end of the connecting part is connected with the end surface of the first barrel facing the second barrel, and adjacent to the outer periphery of the first barrel;

the other end of the connecting end is connected with the end surface of the second barrel, and adjacent to the second barrel.

Selectively, the ejecting passage includes a forward washing ejecting passage and a back washing ejecting passage, the valve body includes a forward washing passage and a back washing passage, there are two ejectors;

one of the ejectors is defined in the forward washing ejecting passage and the other is defined in the back washing ejecting passage, the saline solution suction passage communicates with the saline solution suction openings of the two ejectors;

an outlet of the forward washing passage communicates with an inlet of the forward washing ejecting passage, an outlet of the back washing passage communicates with the back washing ejecting passage; and the water softener valve further includes a switch unit, the switch unit is configured to communicate with the forward washing passage and the forward washing ejecting passage, or configured to communicate with the back washing passage and the ejecting passage.

Selectively, an inner surface of the saline solution suction passage defines an annular mounting groove, the mounting groove includes a first side surface facing a water injection direction, a second side surface facing the first side surface, and a bottom surface located between the first side surface and the second side surface; and the water softener valve further includes an annular restrictor which is made of elastic material and located in the mounting groove, the middle portion of the restrictor forms a restricting hole, an aperture of the restricting hole is gradually decreased along the water injection direction; the restrictor is interference fit with the bottom surface, and the restrictor moves along the direction closing to the first side surface or the second side surface.

Selectively, the restrictor includes an annular body and an annular projecting ridge, the restricting hole is formed in the body, the projecting ridge is defined at an outer peripheral surface of the body, the projecting ridge is interference fit with the bottom surface; and/or the valve body includes a main body and a connecting head, the main body internally defines an inner passage, the connecting head internally defines an outer passage, one end of the connecting head is detachably connected with the main body, allowing the inner passage communicate with the outer passage to form the saline solution suction passage, the other end of the connecting head protrudes from the main body to form an interface, the restrictor is located at the connecting portion of the connecting head and the main body.

Selectively, the body includes a first end surface facing the first side surface, and a second end surface facing water injecting direction, the projecting ridge is adjacent to the second end surface.

Selectively, the second end surface of the body and the inner peripheral surface of the body cooperatively form a rounded corner.

Selectively, the projecting ridge includes a first surface, and a second surface extending outwards along the radial direction of the body, the second surface faces the second side surface, the first surface extends outwards along the radial direction of the body and extends towards the second surface.

Selectively, the first side surface and the bottom surface are formed on the connecting head, the second side surface is formed on the main body.

Selectively, a first dent is formed at the outer peripheral surface of the outlet of the inner passage, and the first dent sleeves around the outer peripheral surface of the outlet of the inner passage. The first dent includes a first peripheral surface adjacent to the inner passage;

the connecting head further includes a second dent connecting to the bottom surface, the second dent includes a second peripheral surface opposite to the first peripheral surface;

the injecting and saline solution suction component of the water softener valve further includes a sealing ring which is tightly matched with the first peripheral surface and the second peripheral surface.

Selectively, the valve body further includes an end cover which is detachably covered on the outer side of the main body, the end cover defines a through hole matching with the interface, the connecting head defines a shoulder resisting on the edge of the through hole.

The present disclosure also provides a water softener, which includes a water softener valve, the water softener valve includes a valve body, the valve body includes a valve cavity, an ejecting passage, a saline solution suction passage, and an ejector, the ejector includes:

an ejecting part, the ejecting part internally defines an ejecting hole, the ejecting hole is gradually tapered along an ejecting direction;

a confluence part, the confluence part internally defines a confluence hole, an inlet of the confluence hole faces an outlet of the ejecting hole, an aperture of the inlet of the confluence hole is greater than an aperture of the outlet of the ejecting hole, a surface of the confluence part and a surface of the ejecting part facing the surface of the confluence part cooperatively form a saline solution suction opening; and a connecting part, fixedly connected with the ejecting part and the confluence part, the connecting part, the ejecting part, and the confluence part are integrated together;

the ejector is received in the ejecting passage, the saline solution suction passage communicates with the saline solution suction opening of the saline solution suction passage.

Selectively, an inner surface of the confluence hole protrudes a plurality of guiding ribs extending along the ejecting direction, each two adjacent guiding ribs cooperatively form a guiding groove, to form a plurality of guiding grooves parallel to each other on the inner surface of the confluence hole.

Selectively, the confluence hole includes an enlarged section and a plain section, the enlarged section is gradually enlarged along the ejecting direction, the enlarged section is adjacent to the ejecting part, the plain section is connected with the far end of the enlarged section along the ejecting direction.

Selectively, the guiding ribs are defined on the plain section.

Selectively, each guiding rib includes a convex cambered surface, a width of a connecting line of the convex cambered surface and the inner surface of the plain section along the circumferential direction gradually increases along the ejecting direction.

Selectively, the guiding ribs are uniformly arranged at the inner surface of the confluence hole along the circumferential direction.

Selectively, each guiding rib includes a convex cambered surface connecting with the inner surface of the plain section, a width of a connecting line of the convex cambered surface and the inner surface of the plain section along the circumferential direction gradually increases along the ejecting direction.

Selectively, the sectional area of each guiding rib at the outlet of the confluence hole equates with the sectional area of the corresponding guiding groove Selectively, the guiding ribs are gradually enlarged along the ejecting direction.

Selectively, the projecting heights of the guiding ribs are gradually enlarged along the ejecting direction; and/or, the projecting widths of the guiding ribs are gradually enlarged along the ejecting direction.

Selectively, the range of the projecting height or the range of the projecting width of the guiding ribs is less than 3 mm.

Selectively, the outer surface of each guiding ribs can have a round arc structure.

Selectively, the ejecting part includes a first barrel and a first matching part, the ejecting hole is formed in the first barrel, the first matching part is defined at the end of the first barrel away from the confluence part, the first matching part is configured to tightly connect to an ejecting passage of the water softener valve; and the confluence part includes a second barrel and a second matching part, the confluence hole is formed in the second barrel, the second matching part is defined at the end of the second barrel away from the confluence part, the second matching part is configured to tightly connect to the ejecting passage of the water softener valve.

Selectively, the first matching part is protruded on the outer peripheral surface of the first barrel, the second matching part is protruded on the outer peripheral surface of the second barrel;

Selectively, the first matching part is protruded on the outer peripheral surface of the first barrel, the second matching part is protruded on the outer peripheral surface of the second barrel;

the first matching part, the outer peripheral surface of the first barrel, the outer peripheral surface of the second barrel, and the second matching part cooperatively form a buffering dent communicating with the saline solution suction opening.

Selectively, the end of the first matching part away from the confluence part defines an annular step groove, the step groove is configured to mount a sealing ring; the end of the second matching part away from the ejecting part defines a chamfering, a chamfered surface of the chamfering resists the other sealing ring.

Selectively, the first barrel and the second barrel are concentric, and the outer diameter of the first barrel equates with the outer diameter of the second barrel.

Selectively, there are multiple connecting parts;

one end of the connecting part is connected with the end surface of the first barrel facing the second barrel, and adjacent to the outer periphery of the first barrel;

the other end of the connecting end is connected with the end surface of the second barrel, and adjacent to the second barrel.

Selectively, the ejecting passage includes a forward washing ejecting passage and a back washing ejecting passage, the valve body includes a forward washing passage and a back washing passage, there are two ejectors;

one of the ejectors is defined in the forward washing ejecting passage and the other is defined in the back washing ejecting passage, the saline solution suction passage communicates with the saline solution suction openings of the two ejectors;

an outlet of the forward washing passage communicates with an inlet of the forward washing ejecting passage, an outlet of the back washing passage communicates with the back washing ejecting passage; and the water softener valve further includes a switch unit, the switch unit is configured to communicate with the forward washing passage and the forward washing ejecting passage, or configured to communicate with the back washing passage and the ejecting passage.

Selectively, an inner surface of the saline solution suction passage defines an annular mounting groove, the mounting groove includes a first side surface facing a water injection direction, a second side surface facing the first side surface, and a bottom surface located between the first side surface and the second side surface; and the water softener valve further includes an annular restrictor which is made of elastic material and located in the mounting groove, the middle portion of the restrictor forms a restricting hole, an aperture of the restricting hole is gradually decreased along the water injection direction; the restrictor is interference fit with the bottom surface, and the restrictor moves along the direction closing to the first side surface or the second side surface.

Selectively, the restrictor includes an annular body and an annular projecting ridge, the restricting hole is formed in the body, the projecting ridge is defined at an outer peripheral surface of the body, the projecting ridge is interference fit with the bottom surface; and/or the valve body includes a main body and a connecting head, the main body internally defines an inner passage, the connecting head internally defines an outer passage, one end of the connecting head is detachably connected with the main body, allowing the inner passage communicate with the outer passage to form the saline solution suction passage, the other end of the connecting head protrudes from the main body to form an interface, the restrictor is located at the connecting portion of the connecting head and the main body.

Selectively, the body includes a first end surface facing the first side surface, and a second end surface facing water injecting direction, the projecting ridge is adjacent to the second end surface.

Selectively, the second end surface of the body and the inner peripheral surface of the body cooperatively form a rounded corner.

Selectively, the projecting ridge includes a first surface, and a second surface extending outwards along the radial direction of the body, the second surface faces the second side surface, the first surface extends outwards along the radial direction of the body and extends towards the second surface.

Selectively, the first side surface and the bottom surface are formed on the connecting head, the second side surface is formed on the main body.

Selectively, a first dent is formed at the outer peripheral surface of the outlet of the inner passage, and the first dent sleeves around the outer peripheral surface of the outlet of the inner passage. The first dent includes a first peripheral surface adjacent to the inner passage;

the connecting head further includes a second dent connecting to the bottom surface, the second dent includes a second peripheral surface opposite to the first peripheral surface;

the injecting and saline solution suction component of the water softener valve further includes a sealing ring which is tightly matched with the first peripheral surface and the second peripheral surface.

Selectively, the valve body further includes an end cover which is detachably covered on the outer side of the main body, the end cover defines a through hole matching with the interface, the connecting head defines a shoulder resisting on the edge of the through hole.

The ejecting part, the confluence part, and the connecting part of the ejector of the present disclosure are integrated together, as such, the ejector can be integrally manufactured. When mounting the water softener valve, it does not need to seal the inner side of the ejector, achieving fewer assembly steps. The alignment between the ejecting hole and the confluence hole, and the size and the shape of the saline solution suction opening can be confirmed in the manufacturing stage. It is easy to mount the ejecting device. After mounting, the effect of sucking saline solution can be ensured, to achieve a better reliability.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure.

LABELS ILLUSTRATION FOR DRAWINGS

Figure 1:
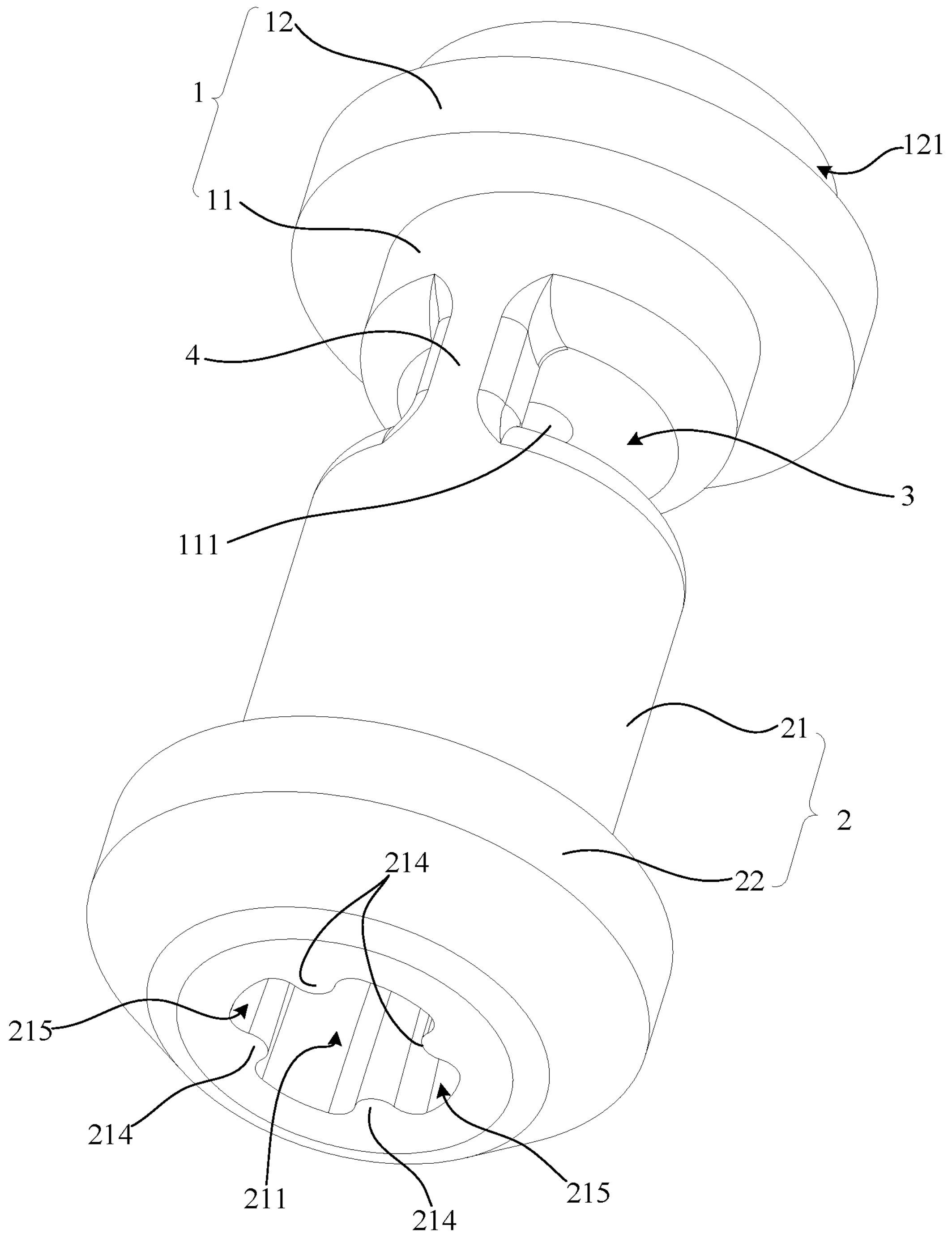
FIG. 1 is a structure diagram of the ejector of the water softener valve according to an exemplary embodiment of the present disclosure.
Figure 2:
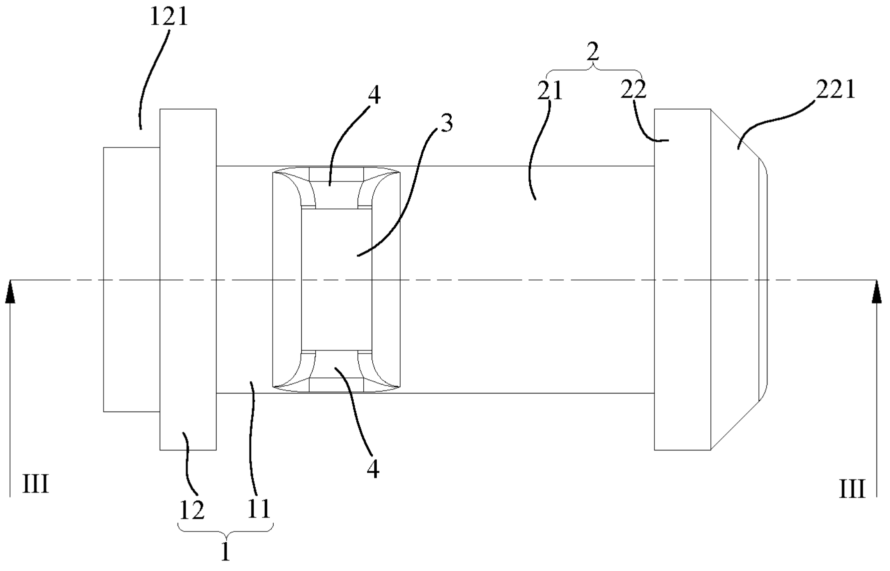
FIG. 2 is a front elevation view of the ejector of the water softener valve shown in FIG. 1.

| Label | Name | Label | Name | Label | Name |
|---|---|---|---|---|---|
| 1 | ejecting part | 110 | valve cavity | 183 | second peripheral surface |
| 11 | first barrel | 120a | forward washing ejecting passage | 184 | shoulder |
| 111 | ejecting hole | 120b | back washing ejecting passage | 190 | end cover |
| 12 | first matching part | 130 | saline solution suction passage | 191 | through hole |
| 121 | step groove | 131 | inner passage | 200 | ejector |
| 2 | confluence part | 132 | outer passage | 310 | long plug |
| 21 | second barrel | 140 | forward washing passage | 320 | short plug |
| 211 | confluence hole | 150 | back washing passage | 400 | restrictor |
| 212 | enlarged section | 160 | mounting groove | 410 | body |
| 213 | plain section | 161 | first side surface | 411 | restricting hole |
| 214 | guiding rib | 162 | second side surface | 412 | outer peripheral surface |
| 215 | guiding groove | 163 | bottom surface | 413 | first end surface |
| 22 | second matching part | 170 | main body | 414 | second end surface |
| 221 | chamfering | 171 | first dent | 415 | inner peripheral surface |
| 3 | saline solution suction opening | 172 | first peripheral surface | 420 | projecting ridge |
| 4 | connecting part | 180 | connecting head | 421 | first surface |
| 5 | buffering dent | 181 | interface | 422 | second surface |
| 100 | valve cavity | 182 | second dent | 500 | sealing ring |

Embodiments of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

The present disclosure provides an ejector of a water softener valve. In the exemplary embodiment of the present disclosure, referring to FIGS. 1-5, 11, the ejector includes: an ejecting part 1, the ejecting part 1 internally defining an ejecting hole 111, the ejecting hole 111 is gradually tapered along an ejecting direction;

a confluence part 2, the confluence part 2 internally defining a confluence hole 211, an inlet of the confluence hole 211 faces an outlet of the ejecting hole 111, an aperture of the inlet of the confluence hole 211 is greater than an aperture of the outlet of the ejecting hole 111, a surface of the confluence part 2 and a surface of the ejecting part 1 facing the surface of the confluence part 2 cooperatively forming a saline solution suction opening 3; and a connecting part 4, fixedly connected with the ejecting part 1 and the confluence part 2, the connecting part 4, the ejecting part 1, and the confluence part 2 are integrated together.

In the exemplary embodiment, a cross section of the inner surface of the ejecting hole 111 of the ejecting part 1 can have a gradually tapered shape, such as, slants which are relative to each other, arcs which are relative to each other, or parabolas which are relative to each other, etc. As the inner diameter of the ejecting hole 11 is gradually reduced, the guiding flow of the raw water gradually accelerate in the ejecting hole 111, finally the guiding flow of the raw water is sprayed into the saline solution suction opening 3 at a faster speed, while the saline solution located at the saline solution suction opening 3 or adjacent to the saline solution suction opening 3 is stagnant or almost stagnant, as such the saline solution can be mixed with the guiding flow of the raw water, and the mixture flows into the confluence hole 211 of the confluence part 2. Percentage ratio of the guiding flow and the saline solution can be controlled through setting the pressure of the guiding flow, the pressure of the saline solution, the size of the jutting hole 111, the size of the saline solution suction opening 3, and the size of the confluence hole 211. The aperture of the inlet of the confluence hole 211 can be greater than the aperture of the outlet of the ejecting hole 111, to improve the ratio of the mixture containing the saline solution and the guiding flow flowing into the confluence hole. The ejector 200 has the integrated structure through the molding process, or the ejector 200 can also be manufactured by the metal die-casting process or machining process. It is preferable to manufacture the ejector 200 through the molding process.

The ejecting part 1, the confluence part 2, and the connecting part 4 of the ejector of the present disclosure are integrated together, as such, the ejector 200 can be integrally manufactured. When mounting the water softener valve, it does not need to seal the inner side of the ejector 200, achieving fewer assembly steps. The alignment between the ejecting hole 111 and the confluence hole 211, and the size and the shape of the saline solution suction opening 3 can be confirmed in the manufacturing stage. It is easy to mount the ejecting device 200. After mounting, the effect of sucking saline solution can be ensured, to achieve a better reliability.

In the exemplary embodiment, an inner surface of the confluence hole 211 is defined with a plurality of guiding ribs 214 protruding from the inner surface of the confluence hole 211 and extending along the ejecting direction, each two adjacent guiding ribs 214 cooperatively form a guiding groove 215, to form a plurality of guiding grooves 215 parallel to each other on the inner surface of the confluence hole 211. The inner surface of the confluence hole 211 defines a plurality of guiding ribs 214 protruding from the inner surface of the confluence hole 211 and extending along the ejecting direction, the guiding ribs 214 cooperatively form multiple guiding grooves 215 which are paralleling to each other, the guiding grooves 215 can be configured to guide the water in the confluence hole 211, to reduce the disorder of the water in the confluence hole 211 caused by the differential pressure, the water can be further aligned, making the ejector 200 produce less noise and vibration, as such user experience is improved.

Furthermore, the confluence hole 211 includes an enlarged section 212 and a plain section 213, the enlarged section 212 is gradually enlarged along the ejecting direction, the enlarged section 212 is adjacent to the ejecting part 1, the plain section 213 is connected with the far end of the enlarged section 212 along the ejecting direction. In the exemplary embodiment, the guiding flow can be mixed with the saline solution through the enlarged section 212, and the mixture can gradually slow down, to avoid the vibration or resonance, as such less noise is produced.

Figure 3:
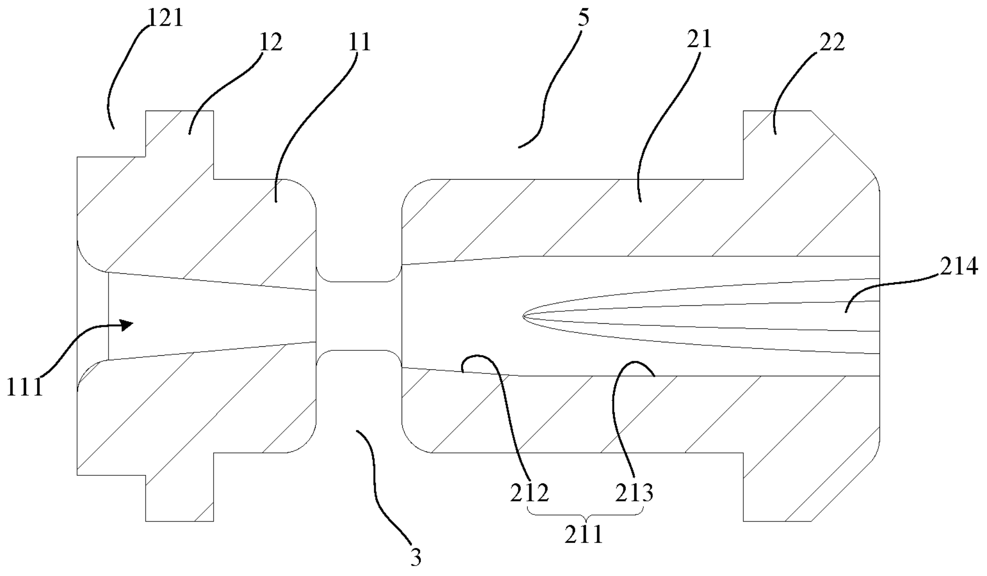
FIG. 3 is a cross section diagram along the line shown in FIG. 2.
Figure 4:
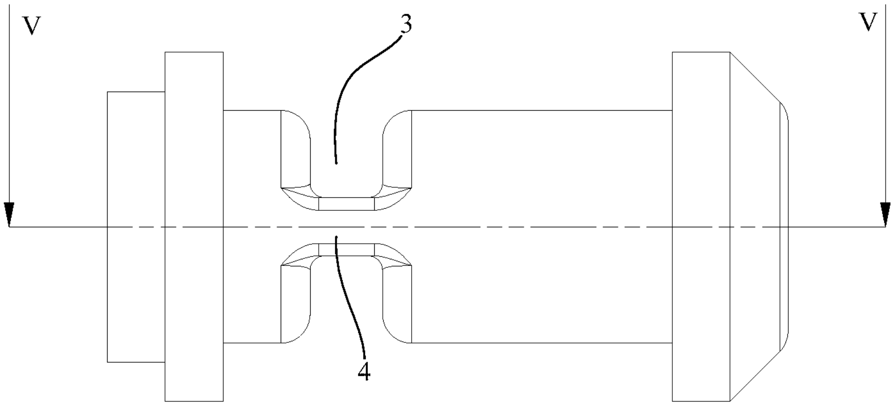
FIG. 4 is a top plan view of the ejector of the water softener valve shown in FIG. 1.
Figure 5:
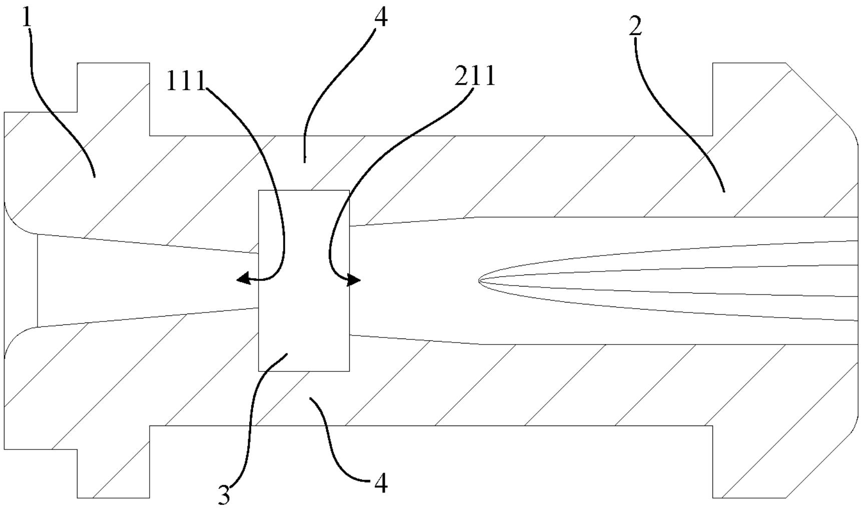
FIG. 5 is a cross section diagram along the line V-V shown in FIG. 4.

Furthermore, referring to FIGS. 1, 3, 5, and, 6, the guiding ribs 214 are defined on the plain section 213. In the exemplary embodiment, although the mixture of the salt and the guiding flow slows down when passing the enlarged section 212, the mixture may also generate turbulence to induce vibration. The guiding ribs 214 formed on the plain section 213 can play the role of guiding and distributing, as such the flow can smoothly pass through the confluence hole 211.

Figure 6:
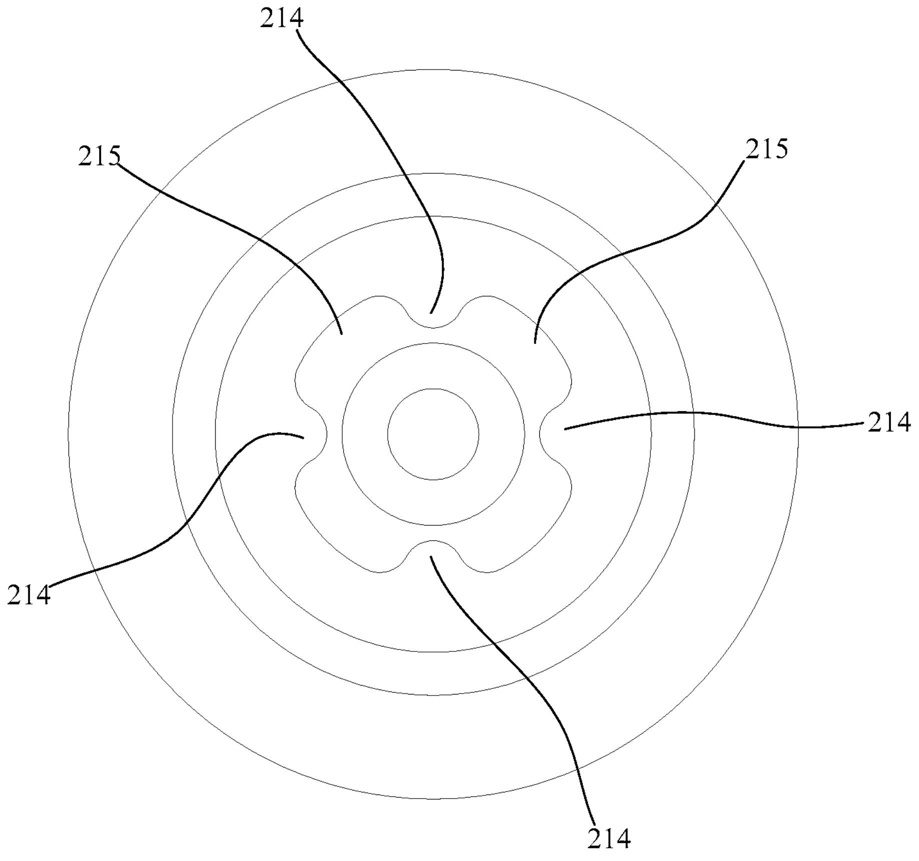
FIG. 6 is a right side elevation view of the ejector of the water softener valve shown in FIG. 4.
Figure 7:
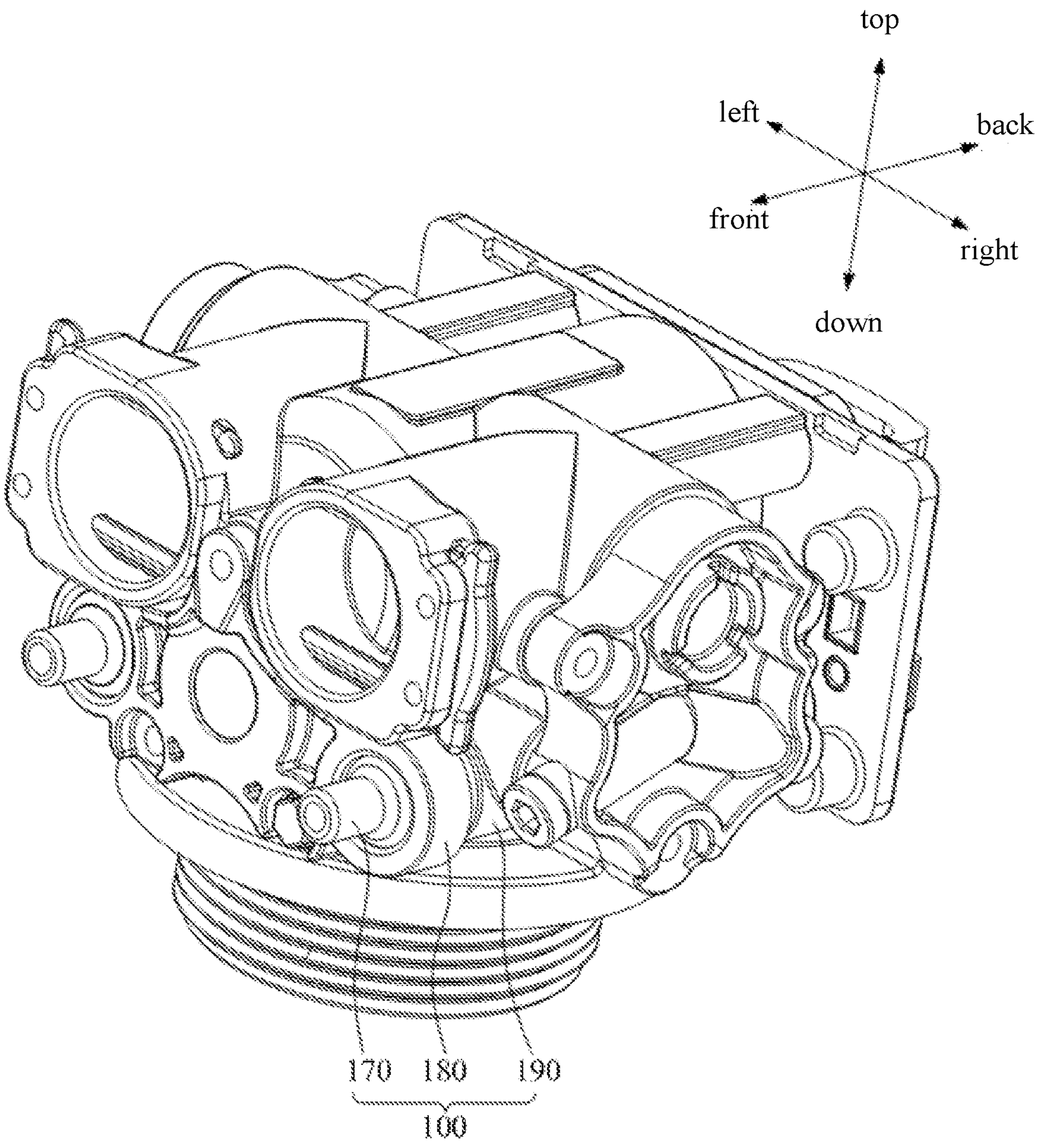
FIG. 7 is a structure diagram of the water softener valve according to an exemplary embodiment of the present disclosure.
Figure 8:
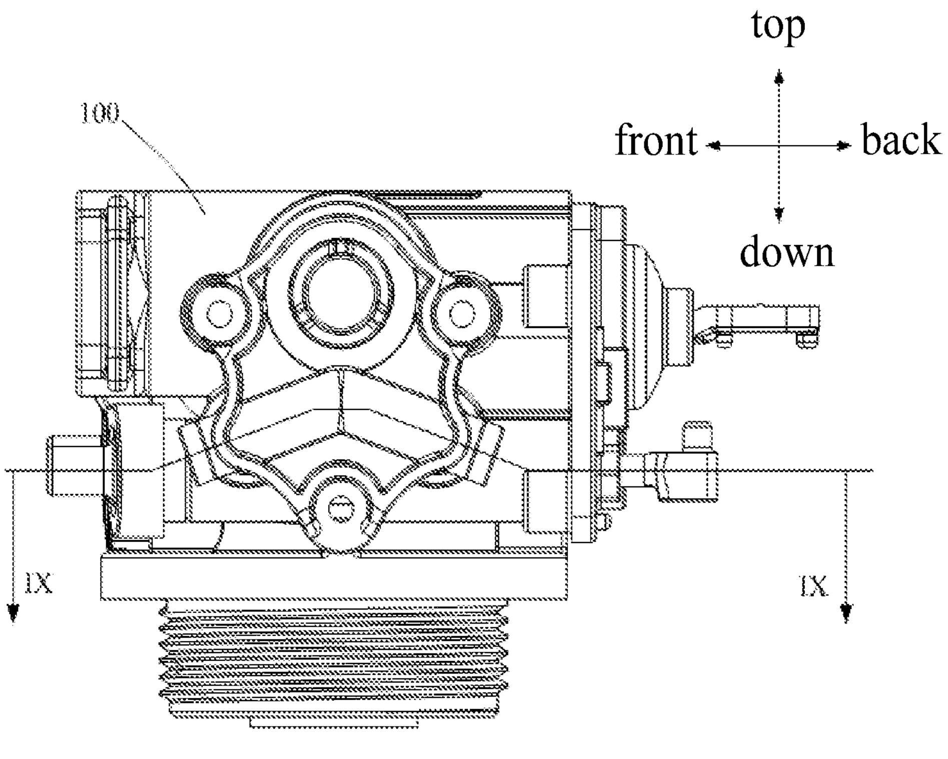
FIG. 8 is a right side elevation view of the water softener valve shown in FIG. 7.
Figure 9:
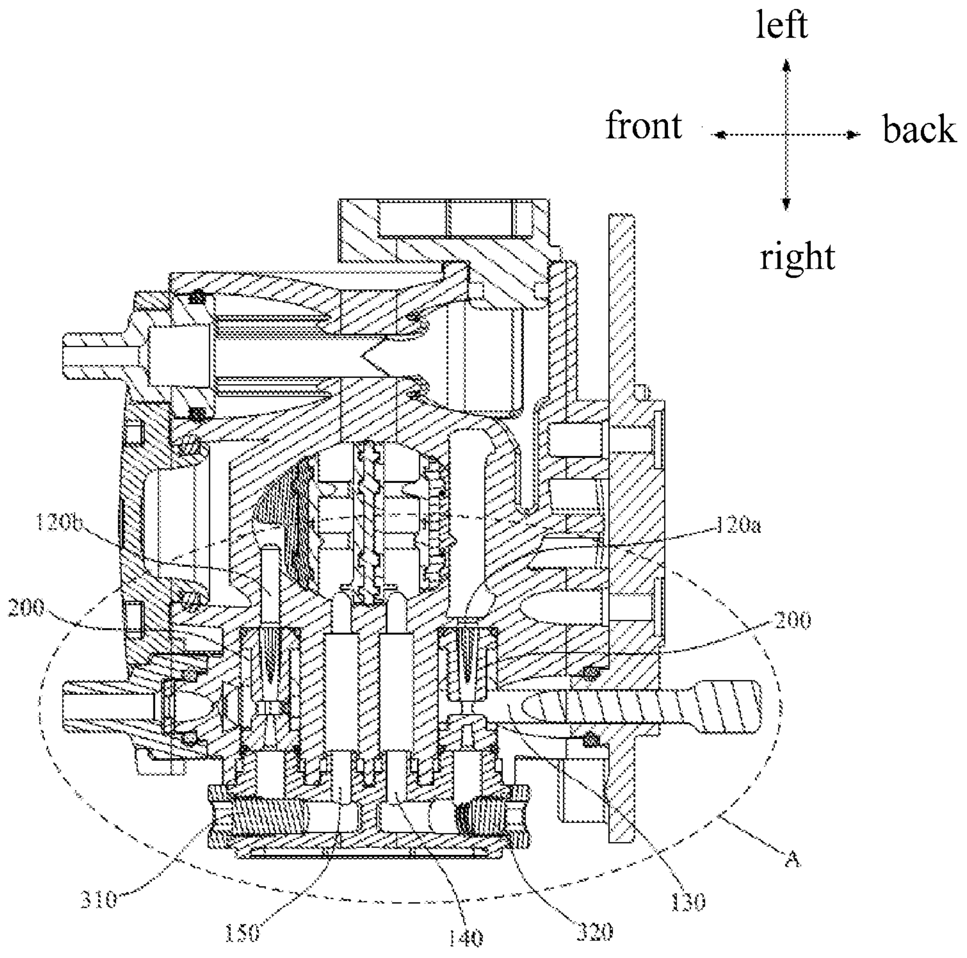
FIG. 9 is a cross section diagram along the line IX-IX shown in FIG. 8.
Figure 10:
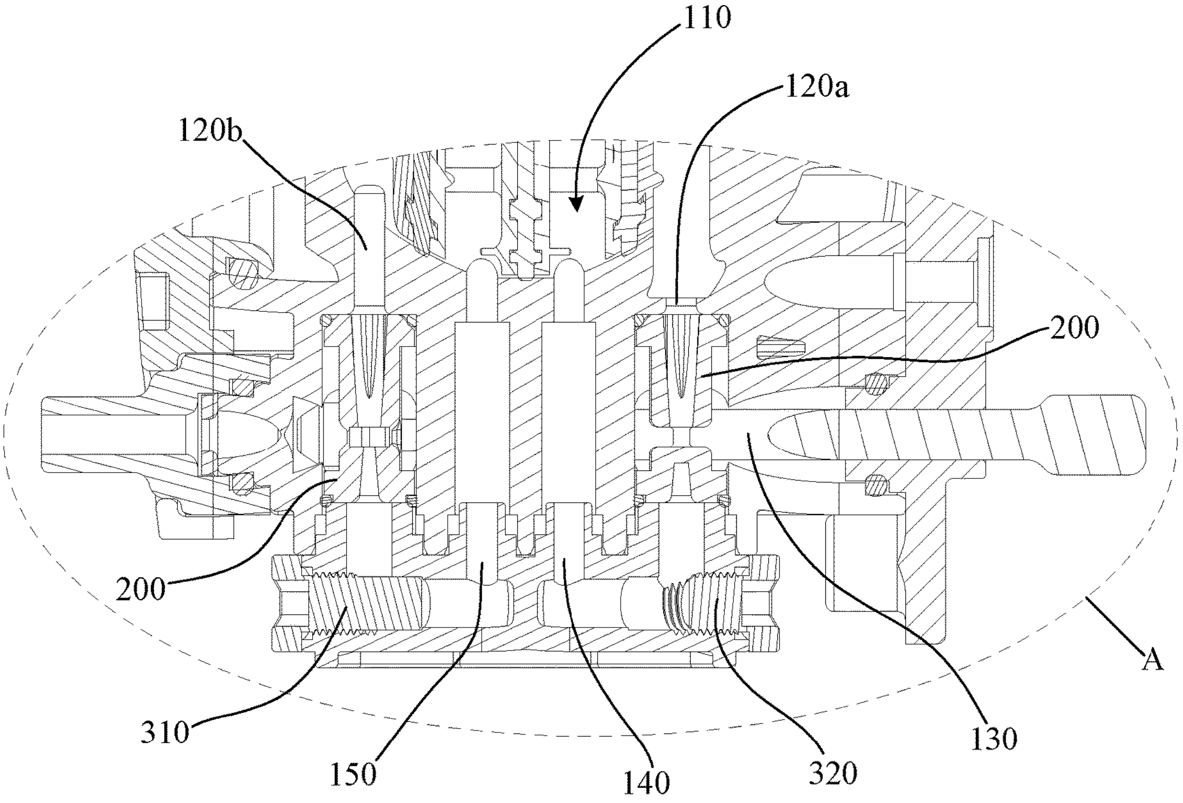
FIG. 10 is an enlarged diagram of portion A shown in FIG. 9.
Figure 11:
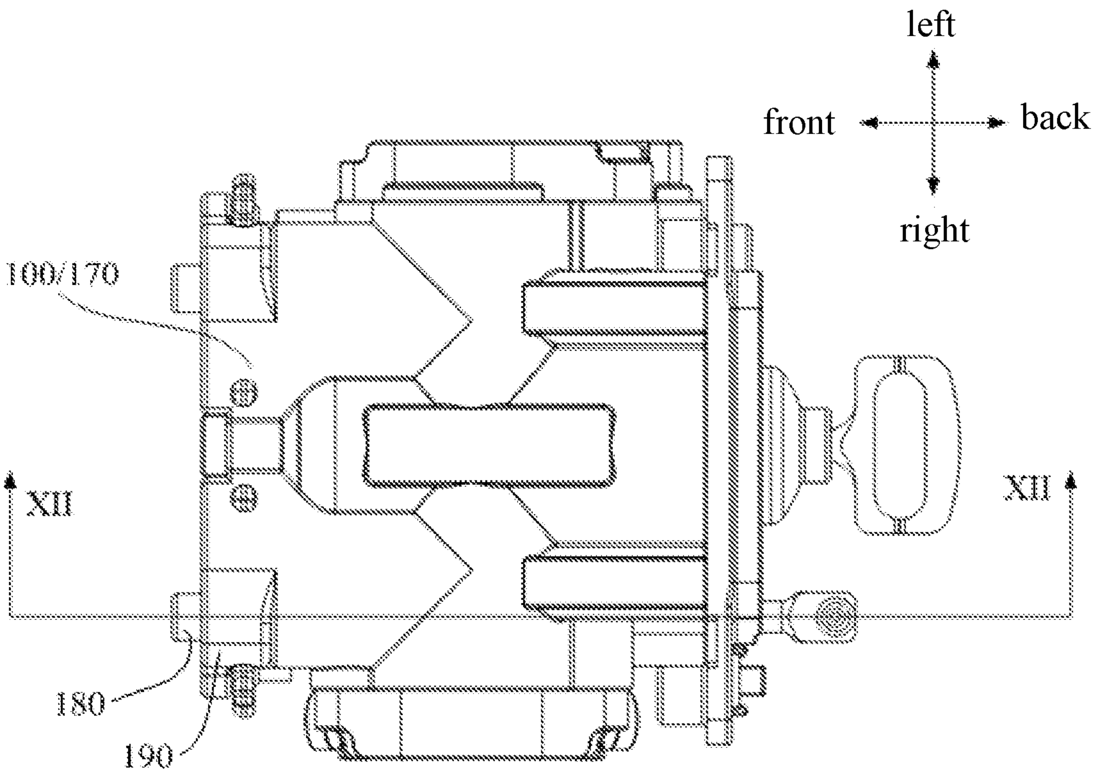
FIG. 11 is a top plan view of the water softener valve shown in FIG. 7.
Figure 12:
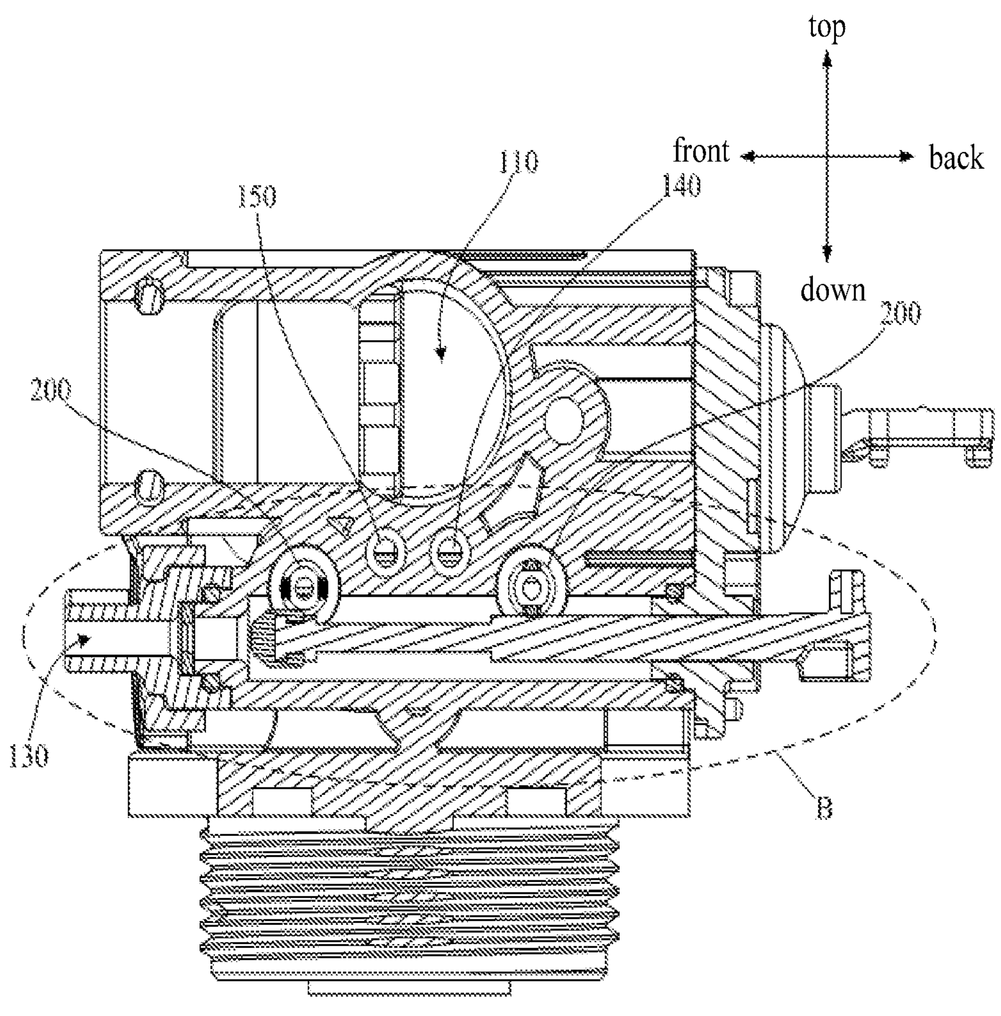
FIG. 12 is a cross section diagram along the line XII-XII shown in FIG. 11.
Figure 13:
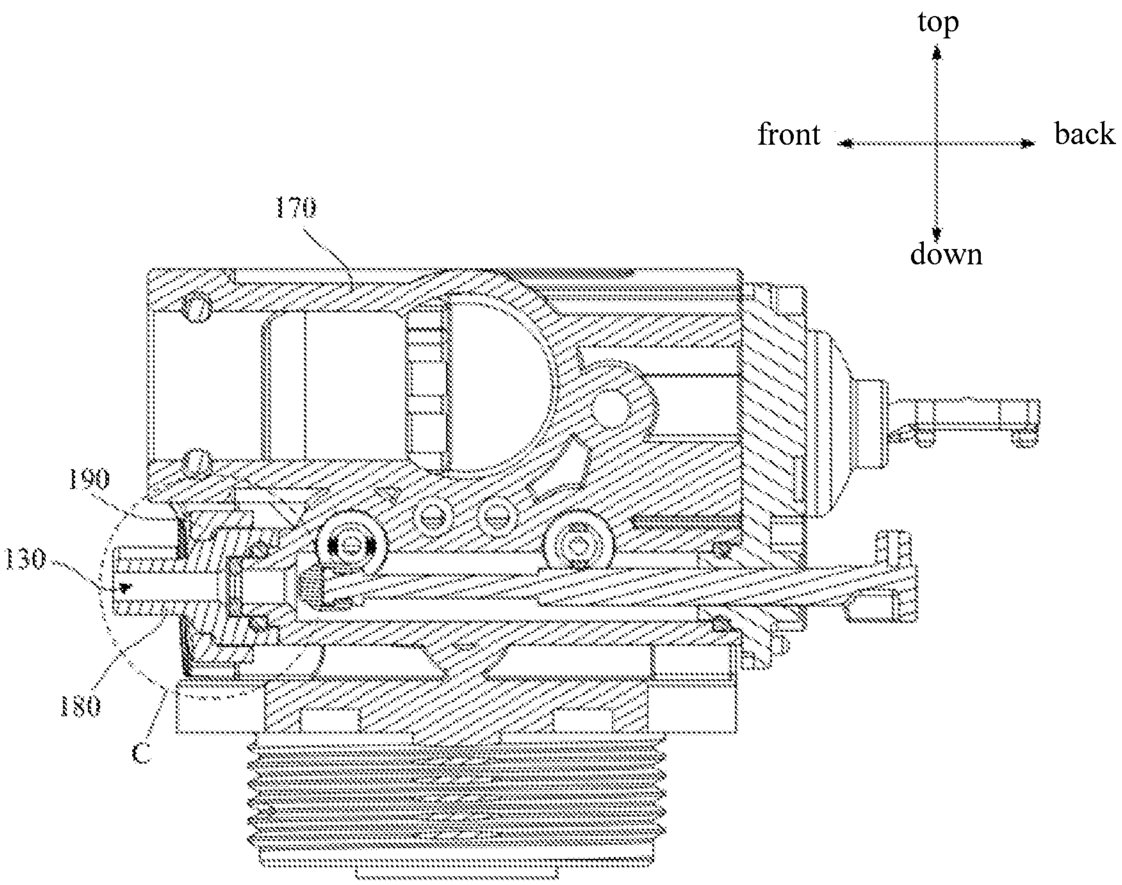
FIG. 13 is a cross section diagram along the line XII-XII shown in FIG. 11.
Figure 14:
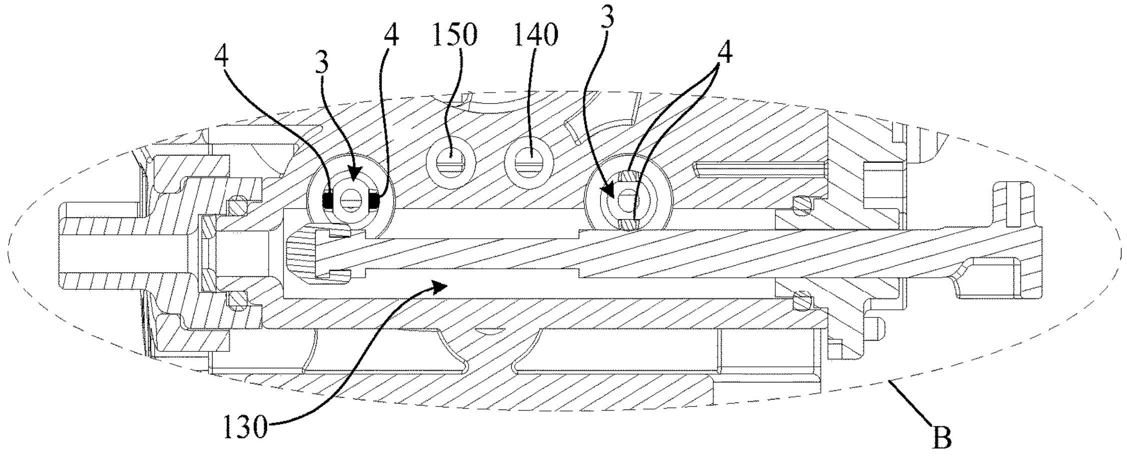
FIG. 14 is an enlarged diagram of portion B shown in FIG. 12.
Figure 15:
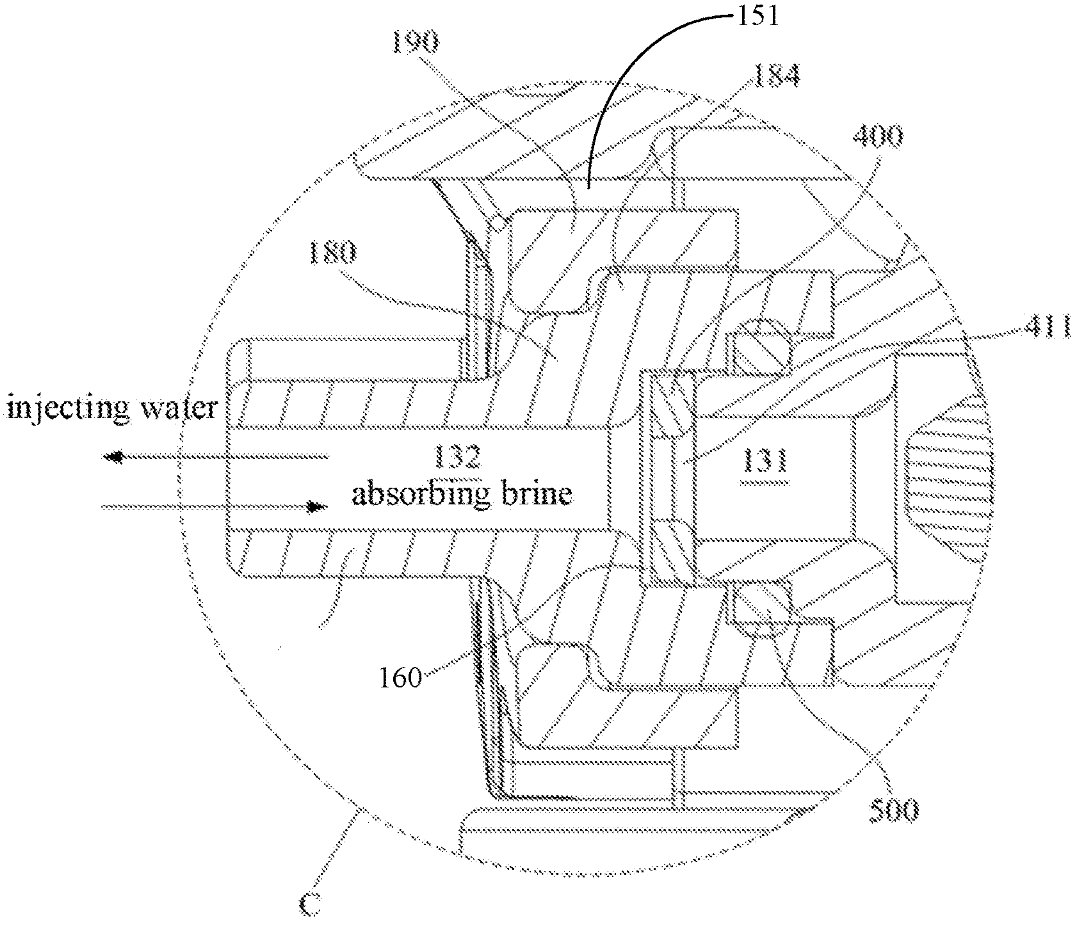
FIG. 15 is an enlarged diagram of portion C shown in FIG. 13.
Figure 16:
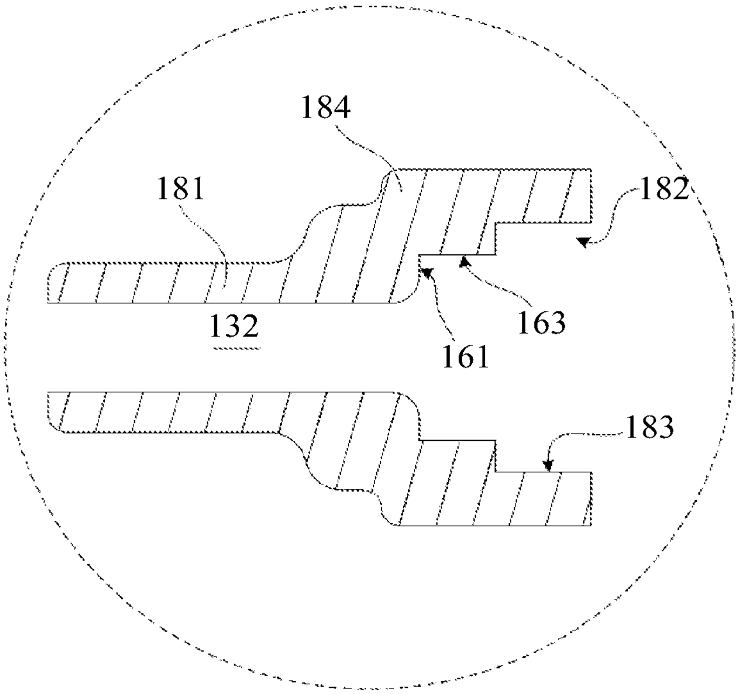
FIG. 16 is a section diagram of the connecting head in the portion C shown in FIG. 13.
Figure 17:
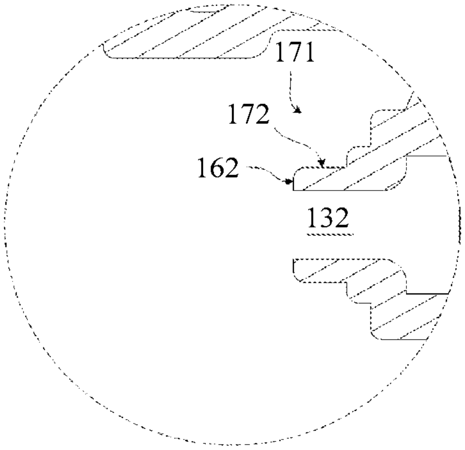
FIG. 17 is a section diagram of the main body in the portion C shown in FIG. 13.

The guiding ribs 214 can be uniformly spaced with each other, or non-uniformly spaced with each other, in detail, in the exemplary embodiment, referring to FIG. 6, the guiding ribs 214 are uniformly arranged at the inner surface of the confluence hole 211 along the circumferential direction. The guiding ribs 214 are uniformly arranged along the circumferential direction, as such the guiding grooves 215 formed by the guiding ribs 214 all have the same size, therefore the functions of guiding grooves 215 for guiding the water flow are consistent, as such the water flow in the confluence hole 211 can be uniformly guided, to distributing the water flow much better, that is, the water flow is distributed much more smoothly, and the outflow is also much more stable, the water flow in the confluence hole 211 is further stabilized, to reduce the noise generated by the vibration of the water flow, therefore, the water flow is much more stable and generates less noise. In detail, in the exemplary embodiment, referring to FIG. 3, there are four guiding ribs 214. The number of the guiding ribs 214 can be set according to the size of the ejector, the present disclosure does not limit the number of the guiding ribs 214.

Furthermore, each guiding rib 214 includes a convex cambered surface connecting with the inner surface of the plain section 213, a width of a connecting line of the convex cambered surface and the inner surface of the plain section 213 along the circumferential direction gradually increases along the ejecting direction. In the exemplary embodiment, the convex cambered surface can be defined as the outer surface of the guiding rib 214, as such the resistance generated in the process of the flow water guided by the guiding ribs 214 is much smaller. The guiding ribs 214 has the gradually enlarged structure, as such the guiding ribs 214 can guide the water flow much better, that is, the water can be distributed much more stable. Referring to the figures, there are four guiding ribs 214 located on the inner surface of the plain section 213, as such the water flow flowing on the inner surface of the plain section 213 can be distributed into four streams.

Furthermore, in detail, referring to FIG. 5, the sectional area of each guiding rib 214 at the outlet of the confluence hole 211 equates with the sectional area of the corresponding guiding groove 215. As such, the cross section of water at the outlet of the confluence hole 211 equates with the cross section of the water at the inlet, and the water flow rate at the outlet of the confluence hole 211 equates with the water flow rate at the inlet, when the resin sucks saline solution to regenerate, the water flow is stable, it is convenient to control the regenerating time of the softened resin, and control the saline solution consumption, which can avoid the resin cannot regenerate sufficiently due to the deficiency of the saline solution, or avoid the resin may regenerate excessively, causing an unnecessary waste.

The guiding ribs 214 can have different structures, in detail, in the exemplary embodiment, referring to FIG. 5, the guiding ribs 214 are gradually enlarged along the ejecting direction. Therefore, when the guiding ribs 214 form the guiding grooves 215, the guiding ribs 214 would not generate a great resistance to the water glow, the water gradually flows gently, to reduce the disorder of the water in the confluence hole 211 caused by the differential pressure, the water can be further aligned to keep the water flowing stably.

The guiding ribs 214 are gradually enlarged along the ejecting direction, there are a plurality of projecting modes. In detail, in the exemplary embodiment, referring to FIGS. 5-6, the projecting heights of the guiding ribs 214 are gradually enlarged along the ejecting direction; and/or the projecting widths of the guiding ribs 214 are gradually enlarged along the ejecting direction. The projecting heights or the projecting widths of the guiding ribs 214 are set to be gradually enlarged, as such the sectional area of the confluence hole 211 is gradually decreased, the cross section of water at the confluence hole 211 equates with the cross section of the water at the inlet, as such when the resin sucks saline solution to regenerates, the water flow is stable, it is convenient to control the regenerating time of the softened resin, and control the saline solution consumption. In the exemplary embodiment, the projecting heights of the guiding ribs 214 are gradually enlarged along the ejecting direction, or the projecting widths of the guiding ribs 214 are gradually enlarged along the ejecting direction, of course, the projecting heights and projection widths of the guiding ribs 214 are gradually enlarged along the ejecting direction. Of course, the guiding ribs 214 can also has another structures which can realize the function of the exemplary embodiment, the present disclosure does not limit it.

Furthermore, in detail, referring to FIGS. 5-6, the range of the projecting height or the range of the projecting width should be set properly. In detail, in the exemplary embodiment, the range of the projecting height or the range of the projecting width of the guiding ribs 214 can be less than 3 mm. The setting can ensure that the guiding ribs 214 only generate a small resistance to the water glow in the confluence hole 211, at the outlet of the confluence hole 211, the sectional area of each guiding rib 214 equates with the sectional area of the corresponding guiding groove 215. Therefore, the water flow rate at the outlet of the confluence hole 211 equates with the water flow rate at the inlet.

Furthermore, in order to stabilize the water flow in the confluence hole 211 of the ejector, and to reduce the noise generated by the vibration of water flow, the guiding ribs 214 can have corresponding surface structures. In detail, in the exemplary embodiment, referring to FIG. 5, the outer surface of each guiding ribs 214 can have a round arc structure. In another exemplary embodiment, the surfaces of the guiding ribs 214 can be flat, inclined, in the exemplary embodiment, the round arc surface can make the guiding ribs 214 generate small resistance to the water flow when guiding the water flow, to stabilize the water flow in the confluence hole 211, for reducing the noise generated by the vibration of water flow Furthermore, the ejecting part 1 includes a first barrel 11 and a first matching part 12, the ejecting hole 111 is formed in the first barrel 1, the first matching part 12 is defined at the end of the first barrel away from the confluence part 2, the first matching part 12 is configured to tightly sealing match with an ejecting passage of the water softener valve; and the confluence part 2 includes a second barrel 21 and a second matching part 22, the confluence hole 211 is formed in the second barrel 21, the second matching part 22 is defined at the end of the second barrel 21 away from the confluence part 2, the second matching part 22 is configured to sealing match with the ejecting passage of the water softener valve.

In the exemplary embodiment, the first matching part 21 and the second matching part 22 can be grooves or protrusions, or can have the thread structures. the present disclosure does not limit the structures of the matching part 21 and the second matching part 22, as long as the matching part 21 and the second matching part 22 can be tightly connected with the inner surface of the ejecting passage. The first barrel 11 forms the ejecting hole 111, the second barrel forms the confluence hole 211, which can ensure that the wall thicknesses of the ejecting part 1 and the confluence part 2 are uniform, as such the ejector 200 can be easily and integrally manufactured by the molding process.

Furthermore, the first matching part 12 is protruded on the outer peripheral surface of the first barrel 11, the second matching part 22 is protruded on the outer peripheral surface of the second barrel 21, the first matching part 12, the outer peripheral surface of the first barrel 11, the outer peripheral surface of the second barrel 21, and the second matching part 22 cooperatively form a buffering dent 5 communicated with the saline solution suction opening 3.

In the exemplary embodiment, the saline solution suction opening 3 can be filled with enough saline solution through the buffering dent 5, when the guiding water pass through the saline solution suction opening 3 at a high speed to bring away some saline solution from the saline solution suction opening 3, then the saline solution suction opening 3 can be fulfilled again quickly, to improve the saline solution suction efficiency.

Furthermore, the end of the first matching part 12 away from the confluence part 2 defines an annular step groove 121, the step groove 121 is configured to mount a sealing ring; the end of the second matching part 22 away from the ejecting part 1 defines a chamfering 221, a chamfered surface of the chamfering 221 resists the other sealing ring. In the exemplary embodiment, when sealing the ejector 200, one sealing ring can be pre-mounted in the step groove 121 of the ejector, the other sealing ring can be pre-mounted on the chamfered surface of the ejecting passage, or pre-mounted in the groove, the mounting process is quick and easy. The sealing ring can be a standard component which is easy to acquire, and the standard component has the advantage of low cost.

Furthermore, the first barrel 11 and the second barrel 21 are concentric, the outer diameter of the first barrel 11 equates with the outer diameter of the second barrel 21. In the exemplary embodiment, the ejecting hole 111 and the confluence hole 211 are concentric, as such when the flowing direction of the water reverses, there would not generate additional resistance to the water. In addition, as the first barrel 11 and the second barrel 21 are concentric, it is easy to manufacture the ejector 200.

Furthermore, there are four connecting parts 4. One end of the connecting part 4 is connected with the end surface of the first barrel 11 facing the second barrel 21, and adjacent to the outer periphery of the first barrel 11; the other end of the connecting end 4 is connected with the end surface of the second barrel 21, and adjacent to the second barrel 21. In the exemplary embodiment, the two ends of connecting part 4 are connected to the edges of the first barrel 11 and the second barrel 21 respectively, to reduce the occupancy of space of the saline solution suction opening 3, and to improve the connecting strength of the connecting part 4 and the ejecting part 1, and to improve the connecting strength of the connecting part 4 and the confluence part 2. in one embodiment, there are two connecting parts 4 for balance, and the two connecting parts 4 are located at the same plane, as such, the resistance is reduced, and the connecting strength is also maintained.

The present disclosure also provides a water softener valve, which includes a valve body 100, the valve body 100 includes a valve cavity 110, an ejecting passage, and a saline solution suction passage, the water softener valve further includes an ejector 200. The detail structure of the ejector 200 can be referred to the above description. As the water softener includes all technical proposals of all the exemplary embodiments, and the achieved technical effects are the same, no need to repeated again. The ejector 200 is located in the ejecting passage, the saline solution suction passage 130 communicates with the saline solution suction opening 3 of the saline solution suction passage 200.

In the exemplary embodiment, the guiding water flows in to the ejector 200 through the inlet through injecting, or the guiding water flows in the ejector 200 through the inlet of the water softener valve, the valve cavity 110, and the regenerating guiding water passage in sequence. The spool in the valve cavity 110 can act to communicating with the inlet or the regenerating guiding passage. The outlet of the ejecting passage communicates with the valve cavity 110, and cooperates with the spool through the valve cavity 110 to communicate with the storage cavity of the ion exchange filter of the water softener, such as a cavity for storing softened resin, for realizing the washing, or the outlet of the ejecting passage cooperates with the spool through the valve cavity 110 to communicate with the center pipe of the water softener, for realizing the back washing. The inlet of the saline solution suction passage 130 is configured to communicate with the saline solution box of the water softener, the saline solution suction passage 130 communicates with the ejecting passage, the ejector is located at the connecting part of the ejecting passage, as such the saline solution suction passage 130 is communicated with the saline solution suction opening 3.

Furthermore, the ejecting passage includes a forward washing ejecting passage 120*a* and a back washing ejecting passage 120*b*, the valve body 100 includes a forward washing passage 140 and a back washing passage 150, there are two ejectors 200; one of the two ejectors 200 is defined in the forward washing ejecting passage 120*a* and the other is defined the back washing ejecting passage 120*b*; the saline solution suction passage 130 communicates with the saline solution suction openings 3 of the ejectors 200; an outlet of the forward washing passage 140 communicates with an inlet of the forward washing ejecting passage 120*a*, an outlet of the back washing passage 150 communicates with the back washing ejecting passage 120*b*; and the water softener valve further includes a switch unit, the switch unit is configured to communicate with the forward washing passage 140 and the forward washing ejecting passage 120*a* when forward washing, or configured to communicate with the back washing passage 150 and the ejecting passage when back washing.

In the exemplary embodiment, one ejecting passage is configured to realize the forward washing, the other ejecting passage is configured to realize the back washing, and the forward washing ejecting passage 120*a* and the back washing ejecting passage 120*b* are both internally provided with the ejector 200, to simplify the action of the spool, and to adopt to different working conditions including forward washing and back washing, the ejectors 200 respectively received in the two ejecting passages have different sizes.

The switch unit can cooperate with the spool component to realize the corresponding forward washing water passage and the back washing water passage. The switch unit can cooperate with the spool component, and the switch unit and the spool component can act simultaneously or successively. The spool component can be adjusted first, and then the switch unit is adjusted, the present disclosure does not limit the order of adjusting the switch unit and the spool component. Similarly, the switch unit can be manually operated or automatically operated.

Selectively, the switch unit includes a long plug 310 and a short plug 320. The outer surface of the valve body 100 defines a first opening configured to communicate with the forward washing ejecting passage 120*a*, and a second opening configured to communicating with the back washing ejecting passage 120*b*. The long plug 310 is mounted in the second opening, and the short plug 320 is mounted in the first opening, to realize the forward washing. And, the long plug 310 is mounted in the first opening, and the short plug 320 is mounted in the second opening, to realize the back washing.

Furthermore, in the exemplary embodiment, referring to FIGS. 12, 15-19, an inner surface of the saline solution suction passage 130 of the valve body 100 defines an annular mounting groove 160, the mounting groove 160 includes a first side surface 161 facing the water injection direction, a second side surface 162 facing the first side surface 161, and a bottom surface 163 located between the first side surface 161 and the second side surface 162. The water softener valve further includes an annular restrictor 400 which is made of elastic material and located in the mounting groove 160, the middle portion of the restrictor 400 forms a restricting hole 411, an aperture of the restricting hole 411 is gradually decreased along the water injection direction; the restrictor 400 is interference fit with the bottom surface 163, and the restrictor 400 moves along the direction closing to the first side surface 161 or the second side surface 162.

In the exemplary embodiment, apart from the saline solution suction passage 130, the valve body 100 can also have the current ejecting passage, the inlet passage, the outlet passage, and the waste water passage, and the valve cavity 100 communicated with the passages. The valve body 100 can have an integrated structure, or a separated structure. In order to adopt to the batch production, the valve body 100 can have the separated structure composed of multiple parts. The present disclosure does not limit the shape of the mounting groove 160, as long as the mounting groove 160 can cooperate with the restrictor 400. Furthermore, the first side surface 161 is parallel to the second side surface 162. The bottom surface 163 is perpendicular to the first side surface 161 or the second side surface 162. The restrictor 400 is normally made of rubber, or silica gel, as such the restrictor 400 can buffer the shock better, and can movably cooperate with the bottom surface 163 better. The restricting hole 411 has the gradually tapered structure, some sections of the restricting hole 411 have the gradually tapered structure, the aperture of the remaining sections is constant. The gradually tapered structure can be formed by oblique lines, arcs, or parabolas.

The restrictor 400 is avoided from being interference fitted with the bottom surface 163, as such, water flow can pass through the restricting hole 411, and the gap between the outer peripheral surface 412 of the restrictor 400 and the bottom surface 163 of the mounting groove 160 simultaneously, to avoid the restrictor 400 from vibrating caused by the two streams of water; one aspect, as the restrictor 400 movably cooperates with the bottom surface 163, the restrictor 400 and the first side surface 161 cooperatively form an avoiding hole, or, the restrictor 400 and the second side surface 162 cooperatively form an avoiding hole, when injecting the restrictor 400 slides towards the first side surface 161, when sucking saline solution the restrictor 400 slides towards the second side surface 162, as such the sliding of the restrictor 400 can absorb the impact of the water flow to reduce the vibration. As the restrictor 400 has the advantage of little vibration, so that the restrictor 400 only generates less noise. The shape of the restricting hole 411 is not easy to deform, as such the restricting hole 411 have better restricting effect.

Figure 18:
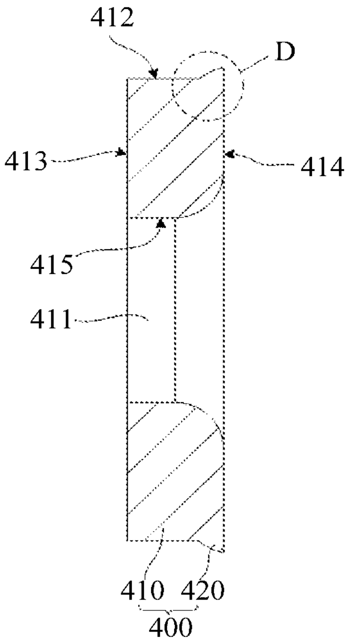
FIG. 18 is a cross section diagram of the restrictor shown in FIG. 13.
Figure 19:
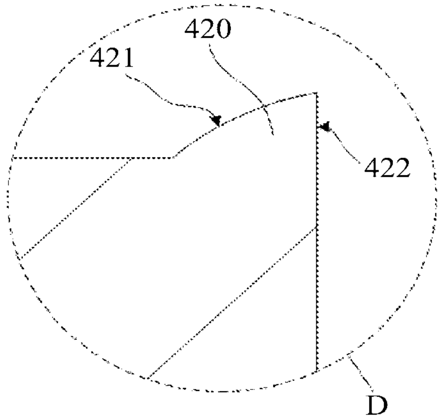
FIG. 19 is an enlarged diagram of portion D shown in FIG. 18.

Furthermore, referring to FIGS. 18-19, in an exemplary embodiment, the restrictor 400 includes an annular body 410 and an annular projecting ridge 420, the restricting hole 411 is formed in the body 410, the projecting ridge 420 is defined at an outer peripheral surface of the body 410, the projecting ridge 420 is interference fit with the bottom surface 413. In the exemplary embodiment, the projecting ridge 420 can be tightly cooperated with the bottom surface 163, the friction caused by the moving of the restrictor 400 can be reduced, to improve the buffering effect.

Furthermore, the body 410 includes a first end surface 413 facing the first side surface 161, and a second end surface 414 facing water injecting direction, the projecting ridge 420 is adjacent to the second end surface 414. In the exemplary embodiment, during the injecting process, the projecting ridge 420 can be took as a fulcrum of the restrictor 400, the pressure of the water applied on the inner surface of the restricting hole 411 can make the far end of the restrictor 400 along the water injecting direction turn outward, until the connecting part of the first end surface 413 and the outer peripheral surface 412 of the body 410 resists the bottom surface 163 of the mounting groove 160. As such, the inlet of the restricting hole 411 is enlarged in the water injecting process, to achieve the aim of expanding water injecting rate. Selectively, the second end surface 414 of the body 410 and the inner peripheral surface 415 of the body 410 cooperatively form a rounded corner. As such, the water can smoothly pass through the restrictor 400.

Furthermore, the projecting ridge 420 includes a first surface 421, and a second surface 422 extending outwards along the radial direction of the body 410, the second surface 422 faces the second side surface 162, the first surface 421 extends outwards along the radial direction of the body 410 and extends towards the second surface 422. In the exemplary embodiment, as the first surface 421 extends aslant, during the water injection process, it only needs a small force to make the far end of the restrictor 400 along the water injection direction turn outwards, to rapidly enlarge the inlet in the water injecting process. In addition, when mounting the restrictor 400 in the mounting groove 160 along the water injecting direction, the first surface 421 extends aslant to perform a guiding function, as such the restrictor 400 can be mounted easily.

Furthermore, the valve body 100 includes a main body 170 and a connecting head. The main body 170 internally defines an inner passage 131, the connecting head 180 internally defines an outer passage 132, one end of the connecting head 180 is detachably connected with the main body 170, allowing the inner passage 131 communicate with the outer passage 132 to form the saline solution suction passage 130, the other end of the connecting head 180 protrudes from the main body 170 to form an interface 181, the restrictor 400 is located at the connecting portion of the connecting head 180 and the main body 170.

In the exemplary embodiment, the connecting head 180 is detachably connected with the main body 170 through a bolt, a screw, a end cover 190, or other fastener, etc. The connecting head 180 can also be connected with the main body 170 through a clamping mode or a threaded connecting mode. The valve body 100 includes the main body 170 and the connecting head 180, and the restrictor 400 is located at the connecting part of the connecting head 180 and the main body 170, as such there is a large space for mounting the restrictor 400, and it is easy to mount the restrictor 400. The restrictor 400 can be mounted to the connecting head 180 first, or mounted to the main body 170 of the valve body 100 first. The interface 181 formed on the connecting head 180 can be easily connected with the soft pipe of the saline solution box of the valve body 100. Selectively, the first side surface 161 and the bottom surface 163 are formed on the connecting head 180, the second side surface 162 is formed on the main body 170, as such, the restrictor 400 can be mounted to the connecting head 180 first, and then the restrictor 400 can be mounted to the main body 170 through the connecting head 180.

Furthermore, a first dent 171 is formed at the outer peripheral surface of the outlet of the inner passage 131, the first dent 171 sleeves around the outer peripheral surface of the outlet of the inner passage 131. The first dent 171 includes a first peripheral surface 172 adjacent to the inner passage 131. The connecting head 180 further includes a second dent 182 connecting to the bottom surface 163, the second dent 182 includes a second peripheral surface 183 opposite to the first peripheral surface 172. The injecting and saline solution suction component of the water softener valve further includes a sealing ring 500 which is tightly matched with the first peripheral surface 172 and the second peripheral surface 183.

In the exemplary embodiment, one end of the connecting head 180 can be embedded into the body 170 through the first dent 171, as such the connecting head 180 can be better supported. The first peripheral surface 172 can be tightly connected with the second peripheral surface 183 through the sealing ring 500, which can prevent that the connecting part of the connecting head 180 and the main body 170 from being leaking.

Furthermore, the valve body 100 further includes an end cover 190 which is detachably covered on the outer side of the main body 170, the end cover 190 defines a through hole 151 matching with the interface 181, the connecting head 180 defines a shoulder 144 resisting on the edge of the through hole 151.

In the exemplary embodiment, it is to be understood that, the end cover 190 can also be configured to cover another fabrication hole formed on the valve body 100, or configured to cover other element. The end cover 190 is integrated with the connecting head 180 to make the valve body 100 much compacter. Then the end cover 190 can be fastened with the main body 170, the inner surface of the end cover 190 is limited by the shoulder 184, as such the connecting head 180 cannot be escaped.

The present disclosure also provides a water softener, which includes an ion exchange tank (not shown), a saline solution box (not shown), and a water softener valve. The detail structure of the water softener valve can be referred to the above description. As the water softener includes all technical proposals of all the exemplary embodiments, and the achieved technical effects are the same, no need to repeated again.

What is claimed is:

1. An ejector of a water softener valve, comprising:

an ejecting part, the ejecting part internally defining an ejecting hole, wherein diameter of the ejecting hole gradually decreases along an ejecting direction;

a confluence part, the confluence part internally defining a confluence hole, an inlet of the confluence hole facing an outlet of the ejecting hole, the inlet of the confluence hole being greater than the outlet of the ejecting hole, a surface of the confluence part and a surface of the ejecting part facing the surface of the confluence part cooperatively forming a saline solution suction opening; and a connecting part, fixedly connected with the ejecting part and the confluence part, the connecting part, the ejecting part, and the confluence part being integrated together;

wherein an inner surface of the confluence hole is defined with a plurality of guiding ribs protruding from the inner surface of the confluence hole and extending along the ejecting direction, each two adjacent guiding ribs cooperatively form a guiding groove, to form a plurality of guiding grooves parallel to each other in the inner surface of the confluence hole;

wherein the confluence hole comprises an enlarged section and a plane section, the enlarged section is gradually enlarged along the ejecting direction, the enlarged section is adjacent to the ejecting part, the plane section is connected with a far end of the enlarged section along the ejecting direction, and diameter of the plane section remains unchanged along the ejecting direction.

2. The ejector according to claim 1, wherein the guiding ribs are defined on the plane section.

3. The ejector according to claim 1, wherein, the ejecting part comprises a first barrel and a first matching part, the ejecting hole is formed in the first barrel, the first matching part is defined at an end of the first barrel away from the confluence part, the first matching part is configured to sealing match with an ejecting passage of the water softener valve;

the confluence part comprises a second barrel and a second matching part, the confluence hole is formed in the second barrel, the second matching part is defined at an end of the second barrel away from the ejecting part, the second matching part is configured to sealing match with the ejecting passage of the water softener valve.

4. A water softener valve, comprising:

a valve body, the valve body comprising a valve cavity, an ejecting passage, and a saline solution suction passage, wherein, the water softener valve further comprises an ejector, the ejector comprises:

an ejecting part, the ejecting part internally defines an ejecting hole, wherein diameter of the ejecting hole gradually decreases tapered along an ejecting direction;

a confluence part, the confluence part internally defines a confluence hole, an inlet of the confluence hole faces an outlet of the ejecting hole, an aperture of the inlet of the confluence hole is greater than an aperture of the outlet of the ejecting hole, a surface of the confluence part and a surface of the ejecting part facing the surface of the confluence part cooperatively form a saline solution suction opening; and a connecting part, fixedly connected with the ejecting part and the confluence part, the connecting part, the ejecting part, and the confluence part are integrated together;

the ejector is received in the ejecting passage, the saline solution suction passage communicates with the saline solution suction opening of the ejector;

wherein an inner surface of the confluence hole is defined with a plurality of guiding ribs protruding from the inner surface of the confluence hole and extending along the ejecting direction, each two adjacent guiding ribs cooperatively form a guiding groove, to form a plurality of guiding grooves parallel to each other in the inner surface of the confluence hole;

wherein the confluence hole comprises an enlarged section and a plane section, the enlarged section is gradually enlarged along the ejecting direction, the enlarged section is adjacent to the ejecting part, the plane section is connected with a far end of the enlarged section along the ejecting direction, and diameter of the plane section remains unchanged along the ejecting direction.

5. The water softener valve according to claim 4, wherein the guiding ribs are defined on the plane section.

6. The water softener valve according to claim 4, wherein, the ejecting part comprises a first barrel and a first matching part, the ejecting hole is formed in the first barrel, the first matching part is defined at an end of the first barrel away from the confluence part, the first matching part is configured to sealing match with an ejecting passage of the water softener valve;

the confluence part comprises a second barrel and a second matching part, the confluence hole is formed in the second barrel, the second matching part is defined at an end of the second barrel away from the ejecting part, the second matching part is configured to sealing match with the ejecting passage of the water softener valve.

7. The water softener valve according to claim 4, wherein, the ejecting passage comprises a forward washing ejecting passage and a back washing ejecting passage, the valve body comprises a forward washing passage and a back washing passage, and there are two ejectors;

one of the ejectors is defined in the forward washing ejecting passage and the other defined in the back washing ejecting passage, a sucking saline solution suction passage communicates with a sucking saline solution suction openings of the two ejectors;

an outlet of the forward washing passage communicates with an inlet of the forward washing ejecting passage, an outlet of the back washing passage communicates with the back washing ejecting passage; and the water softener valve further comprises a switch unit, the switch unit is configured to communicate with the forward washing passage and the forward washing ejecting passage, or configured to communicate with the back washing passage and the ejecting passage.

8. The water softener valve according to claim 4, wherein an inner surface of a saline solution suction passage defines an annular mounting groove, the mounting groove comprises a first side surface facing a water injection direction, a second side surface facing the first side surface, and a bottom surface located between the first side surface and the second side surface; and the water softener valve further comprises an annular restrictor which is made of elastic material and located in the mounting groove, the middle portion of the restrictor forms a restricting hole, an aperture of the restricting hole is gradually decreased along the water injection direction; the restrictor is interference fit with the bottom surface, and the restrictor moves along the direction closing to the first side surface or the second side surface.

9. The water softener valve according to claim 8, wherein the restrictor comprises an annular body and an annular projecting ridge, the restricting hole is formed in the body, the projecting ridge is defined at an outer peripheral surface of the body, the projecting ridge is interference fit with the bottom surface; and/or the valve body comprises a main body and a connecting head, the main body internally defines an inner passage, the connecting head internally defines an outer passage, one end of the connecting head is detachably connected with the main body, allowing the inner passage to communicate with the outer passage to form the saline solution suction passage, the other end of the connecting head protrudes from the main body to form an interface, the restrictor is located at the connecting portion of the connecting head and the main body.

* * * * *